(12) United States Patent
Kiriyama et al.

(10) Patent No.: US 7,109,900 B2
(45) Date of Patent: Sep. 19, 2006

(54) ENCODER OUTPUT SIGNAL CORRECTION APPARATUS AND METHOD

(75) Inventors: Tetsuro Kiriyama, Kawasaki (JP);
Ryuichi Koiso, Kawasaki (JP);
Toshirou Yoshinaka, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 11/248,669

(22) Filed: Oct. 12, 2005

(65) Prior Publication Data
US 2006/0077083 A1    Apr. 13, 2006

(30) Foreign Application Priority Data
Oct. 13, 2004  (JP)  ............... 2004-298954

(51) Int. Cl.
*H03M 1/48*  (2006.01)
(52) U.S. Cl. ...................... 341/115; 341/155
(58) Field of Classification Search ........ 341/115, 341/118, 155, 111, 120; 250/231.16
See application file for complete search history.

(56) References Cited

U.S. PATENT DOCUMENTS

| | | | |
|---|---|---|---|
| 5,475,581 A | * | 12/1995 | Lansberry ............... 363/41 |
| 6,029,363 A | | 2/2000 | Masreliez et al. ........... 33/706 |
| 6,487,787 B1 | * | 12/2002 | Nahum et al. ............. 33/706 |
| 2001/0045824 A1 | | 11/2001 | Godler et al. |

FOREIGN PATENT DOCUMENTS

| | | |
|---|---|---|
| DE | 101 63 504 A1 | 7/2003 |
| EP | 0 412 825 A2 | 2/1991 |
| EP | 0 877 464 A2 | 11/1998 |
| JP | 03-048122 | 3/1991 |
| JP | 08-145724 | 6/1996 |
| JP | 10-311741 | 11/1998 |
| JP | 2003-222534 | 8/2003 |

* cited by examiner

*Primary Examiner*—Peguy JeanPierre
(74) *Attorney, Agent, or Firm*—Rankin, Hall, Porter & Clark LLP

(57) ABSTRACT

A third harmonic distortion corrector is equipped for correcting a third harmonic distortion contained in a two-phase sinusoidal signals with different phases output from an encoder. A third harmonic calculator/detector calculates the amplitude $a_3$ and the phase $\phi_3$ of the third harmonic using Fourier analysis, based on change in radius r of the Lissajous waveform output from a r-$\theta$ converter. The third harmonic distortion corrector corrects the third harmonic distortion of the two-phase sinusoidal signal A4, B4 based on the amplitude $a_3$ and the phase $\phi_3$ of the third harmonic calculated.

12 Claims, 7 Drawing Sheets

ENCODER OUTPUT SIGNAL CORRECTION APPARATUS AND METHOD

CROSS-REFERENCE TO RELATED APPLICATION

This application is based on and claims the benefit of priority from prior Japanese Patent Application No. 2004-298954, filed on Oct. 13, 2004, the entire contents of which are incorporated herein by reference.

BACKGROUND OF THE INVENTION

1. Field of the Invention

The present invention relates to an encoder output signal correction apparatus and method for correcting two-phase sinusoidal signals output from an encoder that detects positions, angles, velocities, angular velocities and so forth.

2. Description of the Related Art

An interval between gratings formed on a scale in an encoder is limited to process. In order to measure a finer interval than that between the scale gratings, the spatial period of a phase variation in a sinusoidal signal output from the encoder should be divided much finer and interpolated. A variety of interpolators have been employed in the art. For example, a digitized interpolator comprises an A/D converter and a memory. The A/D converter is operative to receive A-, B-phase sinusoidal signals with a phase difference of 90° output from the encoder and sample the signals at a certain frequency to convert them into digital data. The memory is employed to store a look-up table for use in searching phase angle data PH at each sampling point based on the digital data DA, DB obtained at the A/D converter. The look-up table is created based on PH=ATAN (DA/DB) using a function of arctangent (ATAN).

The A-, B-phase sinusoidal signals output from the encoder are usually not complete sinusoidal waves and can be represented in an orthogonal coordinate system as describing an elliptical Lissajous waveform generally. When the A-, B-phase sinusoidal signals have different amplitudes in voltage, the Lissajous waveform becomes elliptical. An offset value of each signal voltage turns the Lissajous waveform into a circular or elliptical waveform deviated from the origin. The presence of a phase error brings the major and minor axes of an ellipse into a state not parallel with the coordinate axes but close to 45°. An interpolator is made on the assumption that the A-, B-phase sinusoidal signals are sinusoidal waves. Accordingly, a deviation from an ideal sinusoidal wave exerts an ill effect on the interpolation accuracy. In order to correct amplitude errors, phase errors and offsets in the A-, B-phase sinusoidal signals, devices for the purpose have been proposed in JP-A 10-311741 and JP-A 2003-222534, for example.

In the two-phase sinusoidal signals after such the amplitude error and so fourth are corrected, however, a deviation from an ideal sinusoidal signal waveform, or a waveform distortion, is large, and the distortion factor fluctuates greatly in particular as the interval between a main scale and an index scale fluctuates. The waveform distortion is mostly caused by higher harmonic components of odd degrees (third, fifth degree, and so forth). When the two-phase sinusoidal signals with such the fluctuating distortion factor is employed in measurements, a large measurement error arises.

Several technologies have been proposed to provide sinusoidal signals from which such the higher harmonic components are removed. For example, JP-A 3-48122 proposes a technology, which provides two rectangular grating patterns with a slight phase difference on a scale and sums the outputs therefrom to just cancel higher harmonic components. JP Patent No. 2695623 proposes another technology, in which a scale with uniform gratings and a scale with non-uniform gratings are combined to provide sinusoidal signals from which such the higher harmonic components are removed.

The technology of JP-A 3-48122 reduces the waveform distortion to some extent though the accuracy is not sufficient for application to position measurements in precise machining or the like. The system of JP Patent No. 2695623 requires precise creation of a duty factor between light and dark portions while the precise creation is difficult in a fine scale.

The present invention has an object to provide an encoder output signal correction apparatus and method capable of removing a third harmonic component contained in a sinusoidal signal using relatively simple digital computations, thereby improving the interpolation accuracy in an interpolator. It is also possible to improve robustness against offset errors, amplitude errors, phase errors and higher harmonic component errors due to non-uniformity of scales and non-uniformity of alignments in an encoder.

SUMMARY OF THE INVENTION

To achieve the above object, in one aspect the present invention provides an encoder output signal correction apparatus for correcting two-phase sinusoidal signals with a phase difference output from an encoder. The apparatus comprises a third harmonic calculator calculating at least one of an amplitude and a phase of third harmonic component contained in said two-phase sinusoidal signals on the basis of a variation in radius of a Lissajous waveform of said two-phase sinusoidal signals, and a corrector correcting a third harmonic distortion in said two-phase sinusoidal signals on the basis of at least one of a amplitude and a phase calculated by said third harmonic calculator.

The third harmonic calculator may calculate a maximum and a minimum of a radius of said Lissajous waveform, and calculates an amplitude of said third harmonic component based on said maximum and said minimum. Alternatively, the third harmonic calculator may detect a phase at the time the radius of said Lissajous waveform reaches said maximum and said minimum, and calculates a phase of said third harmonic component based on the detection result.

The third harmonic calculator may derive a frequency signal component through a Fourier analysis of a variation in radius of said Lissajous waveform to calculate at least one of an amplitude and a phase of third harmonic component.

Meanwhile, the corrector may derive, based on the correlation between values of said two-phase sinusoidal signals and values of said third harmonic component when the phase of said third harmonic component is 0 or 90 degrees, values of said third harmonic components corresponding to each value of said two-phase sinusoidal signals, and said apparatus comprises a amplitude corrector subtract said value of said third harmonic component from said two-phase sinusoidal signals to correct an amplitude. The data indicating the correlation may be held in a lookup table, and the amplitude corrector may derive a value of said third harmonic component referring to the lookup table. The corrector may further comprise a coordinate rotator rotating said Lissajous waveform of said two-phase sinusoidal signals including a third harmonic component by an phase calculated in said third harmonic calculator to make a state that the phase of said third harmonic component is 0 or 90 degrees, and a coordinate inverse rotator rotating inversely the Lissajous waveform of said two-phase sinusoidal signals output from said amplitude corrector by the same angle as one rotated in said coordinate rotator.

In another aspect, the present invention provides an encoder output signal correction apparatus for correcting two-phase sinusoidal signals with a phase difference output from an encoder. The encoder comprises a memory storing at least one of an amplitude and a phase of third harmonic component contained in said two-phase sinusoidal signals, a corrector correcting said third harmonic distortion in said two-phase sinusoidal signals, on the basis of at least one of said amplitude and said phase stored in said memory, said memory stores at least one of said amplitude and said phase written therein by an outer circuit calculating at least one of said amplitude and said phase, on the basis of a variation in radius of a Lissajous waveform of said two-phase sinusoidal signals.

In the present invention, an amplitude and a phase of third harmonic component are derived on the basis of a variation in radius of a Lissajous waveform, and then a third harmonic distortion in the two-phase sinusoidal signals is corrected based on it. Therefore, it is possible to improve the interpolation accuracy in an interpolator. It is also possible to improve robustness against higher harmonic component errors due to non-uniformity of scales and non-uniformity of alignments in an encoder.

DETAILED DESCRIPTION OF THE INVENTION

Embodiments of the present invention will now be described in detail with reference to the drawings.

Figure 1:
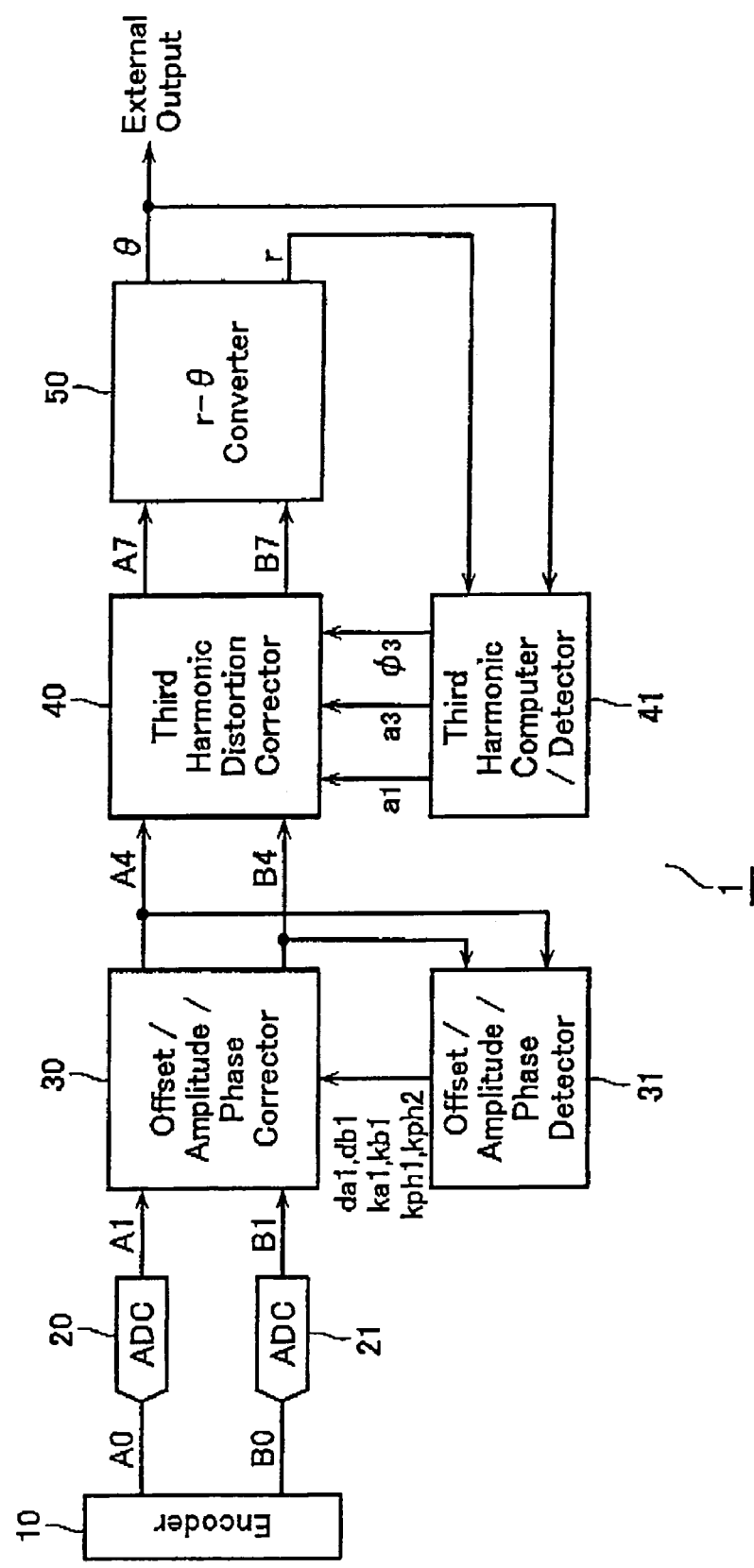
FIG. 1 is a block diagram showing a basic configuration of an encoder output signal correction device 1 according to an embodiment of the present invention.

FIG. 1 is a block diagram showing a basic configuration of an encoder output signal correction device 1 according to an embodiment of the present invention. The encoder output signal correction device 1 comprises A/D converters 20, 21, an offset/amplitude/phase corrector 30, an offset/amplitude/phase detector 31, a third harmonic distortion corrector 40, a third harmonic computer/detector 41, and an r-θ converter 50. This device is operative to correct output signals A0, B0 from the encoder 10 to remove a third harmonic distortion therefrom.

The encoder 10 may be of the photoelectric type or the magnetic type, for example, without distinction of detection principle. The A- and B-phase sinusoidal signals A0, B0 output from the encoder 10 may usually contain an amplitude error, a phase error, an offset or the like.

The signals A0, B0 are sampled by the A/D converters 20, 21 at a certain frequency and converted into digital signals A1, B1, which are fed to the offset/amplitude/phase corrector 30. Based on correction coefficients computed at the offset/amplitude/phase detector 31, the offset/amplitude/phase corrector 30 corrects offsets, amplitudes and phases of the digital signals A1, B1 and provides output signals A4, B4. Based on the output signals A4, B4, the offset/amplitude/phase detector 31 computes the correction coefficients for use in the offset/amplitude/phase corrector 30. Since the method for calculating the correction coefficients is the same as the prior art references listed above, detailed explanation thereof may be omitted.

The output signals A4, B4 are amplitude-, phase- and offset-corrected sinusoidal output signals but still contain higher harmonic components including third harmonics.

The third harmonics can be assumed to have the same amplitude and phase. In this case, if the fundamental harmonic has an amplitude of $a_1$, the third harmonic has an amplitude of $a_3$, and the third harmonic has a phase of $\phi_3$, then the output signals A4, B4 can be represented by the following Expression.

$$A4 = a_1 \cos u + a_3 \cos 3(u-\phi 3)$$

$$B4 = a_1 \cos (u-\pi/4) + a_3 \cos 3(u-\pi/4-\phi_3) \quad \text{[Formula 1]}$$

Note that u=2*pai*x/lambda, rambda means a signal pitch, and X means a displacement.

Therefore, a Lissajous radius r associated with the signals A4, B4 can be computed in accordance with the following Expression.

$$r^2 = A4^2 + B4^2 \quad \text{[Formula 2]}$$
$$= a_1^2 + a_3^2 + 2a_1 a_3 \cos(4u - 3\phi_3)$$

As obvious from the above Expression, the Lissajous radius r varies at a period of λ/4 with a phase of $3\phi_3$ between the maximum $r_{max}=a_1+a_3$ and the minimum $r_{min}=a_1-a_3$. Therefore, determination of $a_1$, $a_3$ and $\phi_3$ can correct the third harmonic distortion.

The third harmonic distortion corrector 40 corrects third harmonic components in the output signals A4, B4 and provides output signals A7, B7. This correction is executed based on correction coefficients (an amplitude $a_1$ of a fundamental harmonic, an amplitude $a_3$ of a third harmonic, and a phase $\phi_3$ of a third harmonic) given from the third harmonic computer/detector 41.

The r-θ converter 50 creates a Lissajous waveform from the output signals A7, B7 and computes a radius r at each phase θ of the Lissajous waveform. The third harmonic computer/detector 41 computes the correction coefficients (an amplitude $a_1$ of a fundamental harmonic, an amplitude $a_3$ of a third harmonic, and a phase $\phi_3$ of a third harmonic) based on these r, θ.

Specific circuitry of the offset/amplitude/phase corrector 30 and the third harmonic distortion corrector 40 are described with reference to FIG. 2.

The offset/amplitude/phase corrector 30 comprises an offset corrector 301, an amplitude corrector 302, and a phase corrector 303. The offset corrector 301 includes adders 310, 311 and executes the offset correction such that addition coefficients da1, db1 given from the offset/amplitude/phase detector 31 are added to the signals A1, B1, respectively. The amplitude corrector 302 includes multipliers 320, 321 and executes the amplitude correction such that the signals A2, B2 are multiplied by multiplication coefficients ka1, kb1 given from the offset/amplitude/phase detector 31, respectively. The phase corrector 303 includes multipliers 330–333 and adders 340, 341 and executes the phase correction such that multiplication coefficients kph1, kph2 given from the offset/amplitude/phase detector 31 are employed to convert the signals A3, B3 into the output signals A4, B4.

$A4 = kph1 \cdot A3 + kph2 \cdot B3$ $B4 = kph2 \cdot A3 + kph1 \cdot B3$ [Formula 3]

Figure 2:
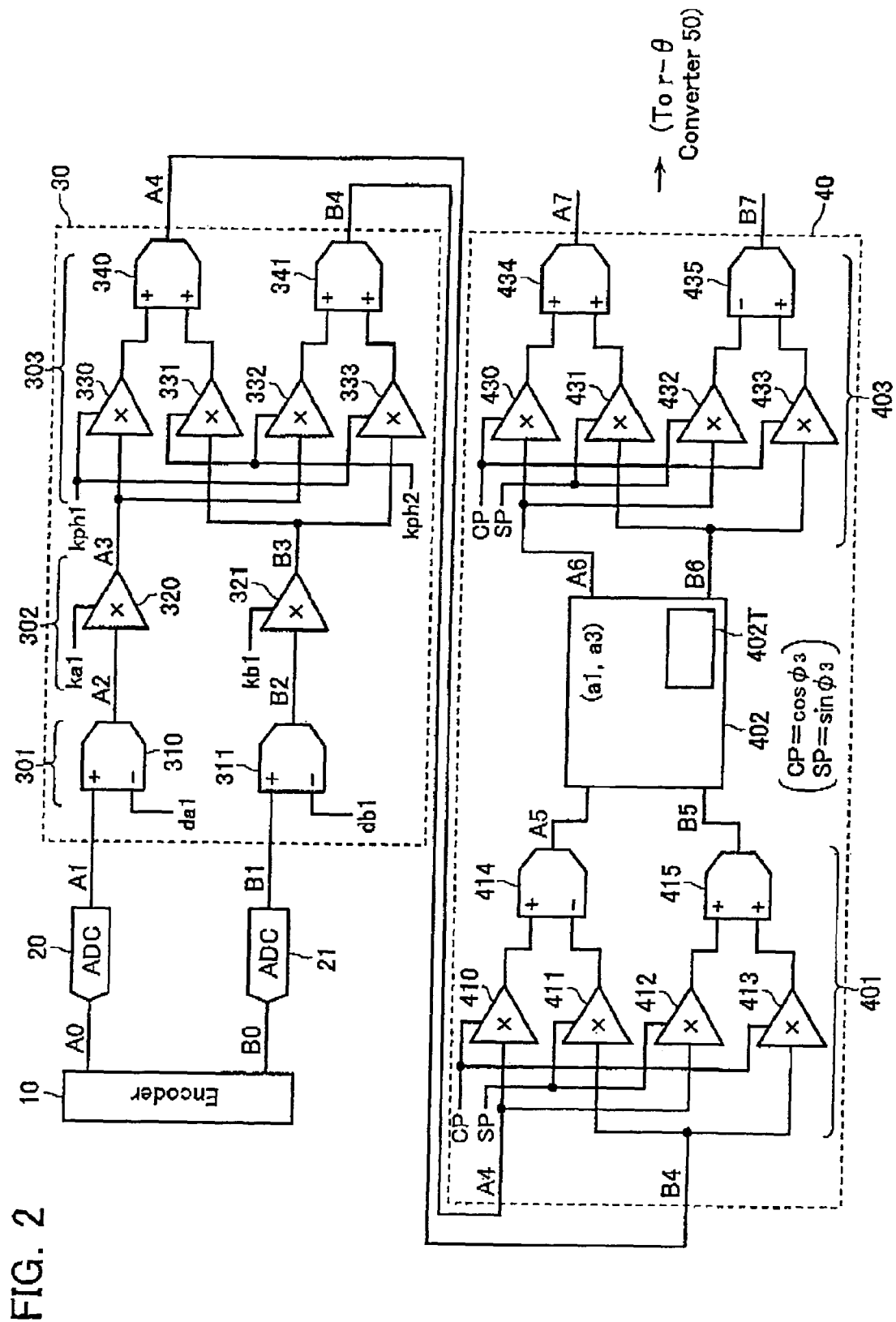
FIG. 2 is is a circuit diagram showing specific circuitry of an offset/amplitude/phase corrector 30 and a third harmonic distortion corrector 40.
Figure 3:
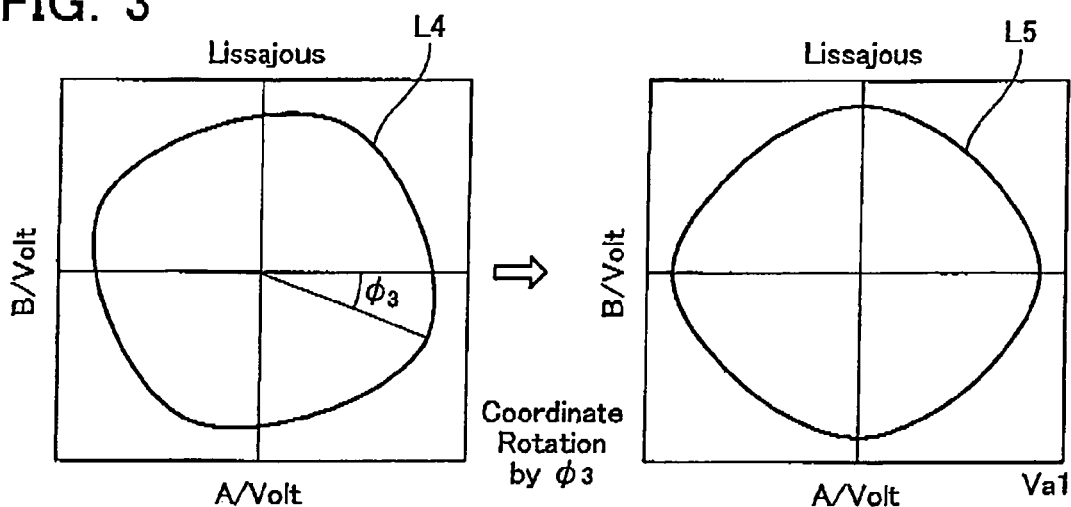
FIG. 3 is a figure for explaining a function of the coordinate rotator 401 depicted in FIG. 2.

As shown in FIG. 2, the third harmonic distortion corrector 40 comprises a coordinate rotator 401, an amplitude corrector 402, and a coordinate inverse rotator 403. The coordinate rotator 401 includes multipliers 410–413 and adders 414, 415. The coordinate rotator 401 is operative to rotate the Lissajous waveform L4 of the signals A4, B4 as shown in the left side of FIG. 3 counterclockwise by the angle $\phi_3$ corresponding to the phase of the third harmonic, by performing calculation shown in the following Formula 4, to create the Lissajous waveform L5 corresponding to the signals A5, B5 as shown in the right side of FIG. 3.

The rotation of the angle $\phi_3$ is performed to make the third harmonic have a phase of 0° or 90° on the Lissajous waveform and in this state, execute the process in the amplitude corrector 402 in the next stage.

$$\begin{pmatrix} A5 \\ B5 \end{pmatrix} = \begin{pmatrix} \cos\phi_3 & -\sin\phi_3 \\ \sin\phi_3 & \cos\phi_3 \end{pmatrix} \begin{pmatrix} A4 \\ B4 \end{pmatrix}$$ [Formula 4]

The amplitude corrector 402 employs the fundamental harmonic amplitude $a_1$ and the third harmonic amplitude $a_3$ computed at the third harmonic computer/detector 41 for correction to remove the third harmonic component from the output signals A5, B5 having the third harmonic with a phase of 0° or 90°.

Figure 4:
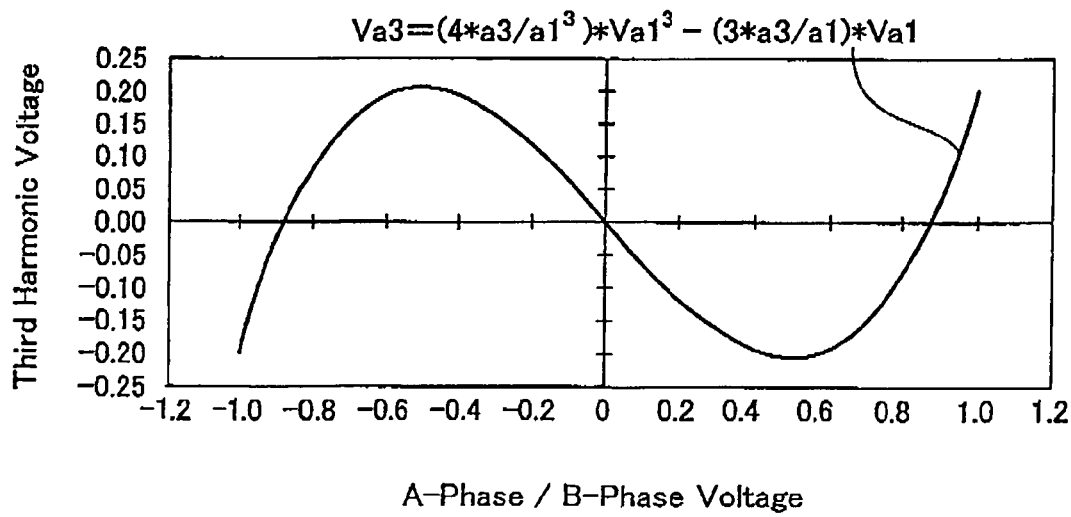
FIG. 4 shows a correlation data stored in the lookup table 402T in the amplitude corrector 402 depicted in FIG. 2.

Namely, when the phase $\phi_3$ is 0° or 90°, plotting correlation between the voltage (value) Va$_1$ of the output signal A5 (or B5) and the voltage (value) Va$_3$ of its third harmonic component, provides a relationship described by the graph shown in FIG. 4. This graph is expressed by the following equation.

$$Va_3 = \frac{4a_3}{a_1^3} Va_1^3 - \frac{3a_3}{a_1} Va_1$$ [Formula 5]

The output signal A5, B5 includes a third harmonic component as expressed Va$_3$ in the Formula 5. Therefore, a correction for subsracting the third harmonic component can be executed in the amplitude corrector 402 by subtracting Va$_3$ calculated by the Formula 5 from the output signals A5, B5 to obtain output signals A6, B6. This calculation can be realized by setting up a lookup table 402T in the amplitude corrector 402, which stores relationship between Va$_1$ and va$_3$ shown by Formula 5, or one between Va$_1$ and (Va$_1$−va$_3$). In a word, the output signal A6 (or B6) may be obtained, by making each sampling value (Va$_1$) of the output signal A5 (or B5) an index to the lookup table 402T, and reaing out the third harmonic component value Va3 as an output to subtract it from Va1. Alternatively, outputting (Va$_1$−va$_3$) from the lookup table 402T enables the output signal A6, B6 to be obtained directly.

The coordinate inverse rotator 403 includes multipliers 430–433 and adders 434, 435 and rotates the Lissajous waveform of the signals A6, B6 clockwise by the angle $\phi_3$ rotated at the coordinate rotator 401 or inversely (by the angle $-\phi_3$) to create the signals A7, B7 through the following computations. The Lissajous waveform rotated by the angle $-\phi_3$, or the output signals A7, B7, contains the same fundamental harmonic as those of the original output signals A4, B4, and the third harmonic component is subtracted therefrom.

$$\begin{pmatrix} A7 \\ B7 \end{pmatrix} = \begin{pmatrix} \cos(-\phi_3) & -\sin(-\phi_3) \\ \sin(-\phi_3) & \cos(-\phi_3) \end{pmatrix} \begin{pmatrix} A6 \\ B6 \end{pmatrix}$$ [Formula 6]

The r-θ converter 50 converts the output signals A7, B7 into a radius r and a phase θ expressing the Lissajous waveform. The conversion is performed according to the following equation.

$$\theta = L(A7, B7) = \tan^{-1}\left(\frac{B7}{A7}\right)$$ [Formula 7]

$$r = ABS(A7, B7) = \sqrt{A7^2 + B7^2}$$

Next, methods of calculating the amplitude $a_1$, the amplitude $a_3$, and the phase $\phi_3$, based on the radius r and the phase θ in the third harmonic calculator/detector 41, will be explained in detail.

(Method 1)

Figure 5:
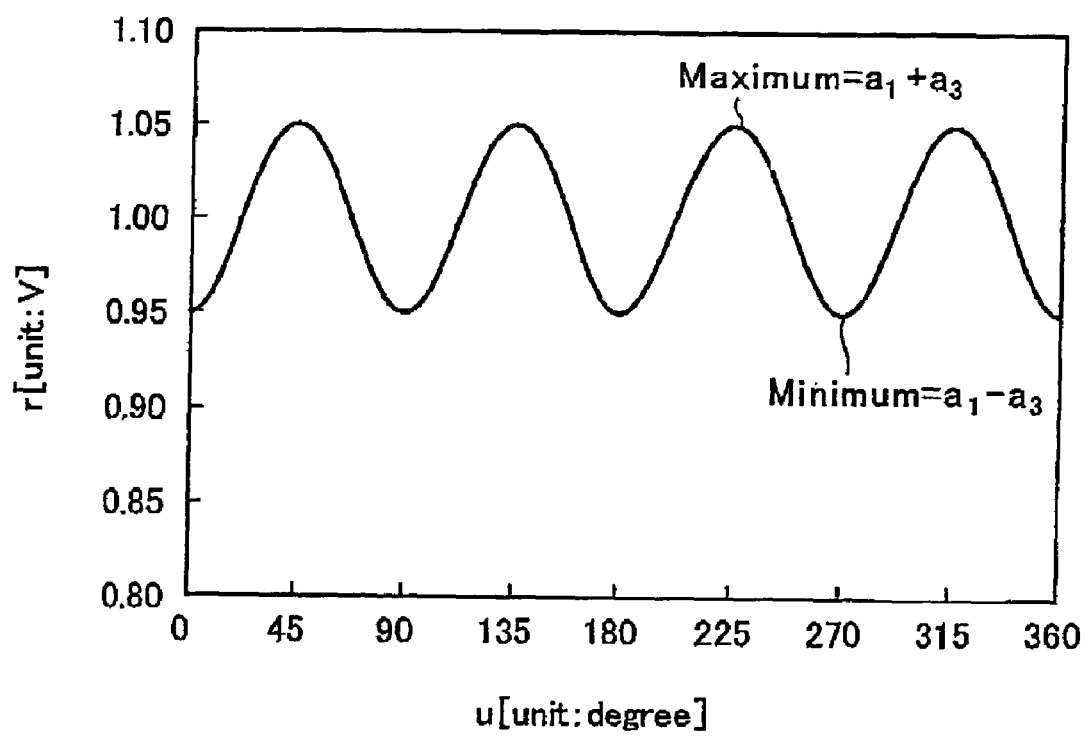
FIG. 5 illustrates a computing method of amplitudes a1, a3 in a third harmonic.

First, a much simpler first method is explained. As described above, the radius r of the Lissajous waveform varies at a period of λ/4 due to the third harmonic distortion and has the maximum $r_{max} = a_1 + a_3$ and the minimum $r_{min} = a_1 - a_3$ (see FIG. 5). Therefore, $a_1$, $a_3$ can be computed using $r_{max}$, $r_{min}$ as follows.

$a_1 = (r_{max} + r_{min})/2$ $a_3 = (r_{max} - r_{min})/2$ [Formula 8]

The phase $\phi_3$ can be derived using a value of u (FIG. 5: multivalue) when the radius r is at the maximum or minimum.

(Method 2)

Although The method 1 is simple and needs less load of computers, it has a possibility of suffering lower detection sensibility of the phase $\phi_3$, when the amplitude of the third harmonic component becomes small. The next-described method 2 is one that enables the $\phi_3$ to be calculated more exactly. The method 2 will be described hereinbelow. In this method 2, the amplitude $a_1$, the amplitude $a_3$, and the phase $\phi_3$ are calculated, using Fourier analysis.

Namely, suppose that a signal component having a wavelength of λ/4 (a spatial frequency of 4·2π/λ) contained in a Lissajous waveform is Fourier-transformed into a real part Re and an imaginary part Im. For use in dynamic correction, from the real part and the imaginary part detected from the corrected waveform, dRe and dIm represented by [Expression 9] and [Expression 10] are derived to update Re and Im in accordance with a recurrence formula represented by [Expression 11]. This update is repeated several times to converge Re, Im on certain values. Accordingly, these values are determined as Re, Im.

$$d\,\text{Re} = \sum_{i=0}^{N-1} r_i \cos\left(2\pi \frac{4}{N} i\right) \quad \text{[Formula 9]}$$

$$d\,\text{Im} = \sum_{i=0}^{N-1} r_i \sin\left(2\pi \frac{4}{N} i\right) \quad \text{[Formula 10]}$$

$$\text{Re} = \text{Re} + d\,\text{Re} \quad \text{[Formula 11]}$$
$$\text{Im} = \text{Im} + d\,\text{Im}$$

In accordance with [Expression 12] shown below, $a_1$ is obtained. In addition, based on Re and Im determined by the above [Expression 11], $a_3$ and $\phi_3$ are obtained in accordance with the following [Expression 13] and [Expression 14] as a distance from and an angle to the coordinate origin in a complex space specified by Re, Im. In [Expression 13], a multiplication coefficient $\sqrt{2}$ is employed because the magnitude of the signal obtained through Fourier transformation is an effective value and the amplitude is $\sqrt{2}$ times the value.

$$a_1 = \frac{1}{N} \sum_{i=0}^{N-1} r_i \quad \text{[Formula 12]}$$

$$a_3 = \frac{1}{2N} \sqrt{2(\text{Re}^2 + \text{Im}^2)} \quad \text{[Formula 13]}$$

$$\phi_3 = \tan^{-1}(\text{Im}/\text{Re}) \quad \text{[Formula 14]}$$

Figure 6A:
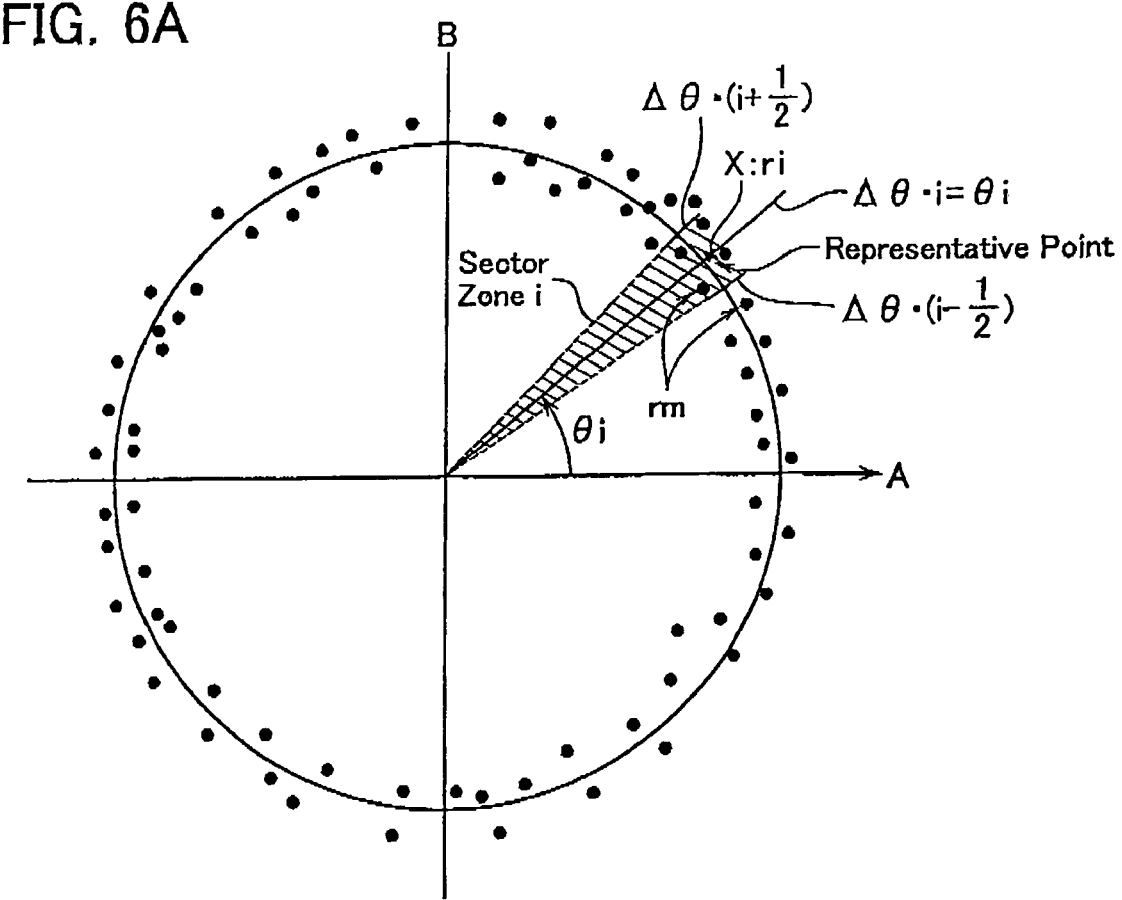
FIG. 6 illustrates a computing method of a radius r, and a phase θ in the r-θ converter 50.
Figure 6B:
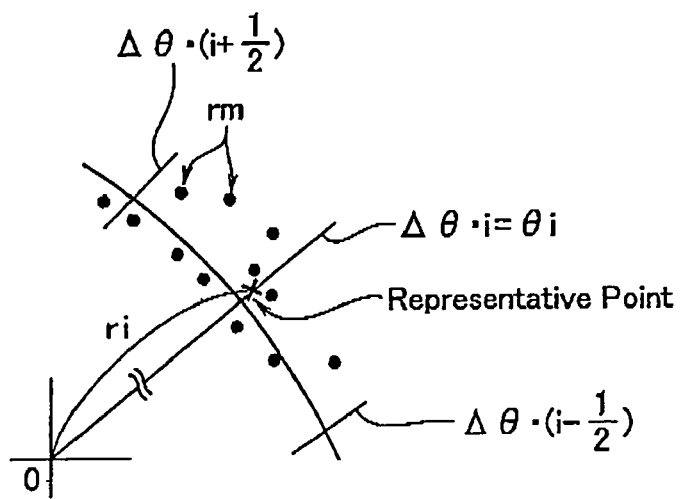

When performing Fourier analysis, radiuses $r_i$ need to be sampled in the rotation direction at an equal pitch. Thus, one turn of the Lissajous waveform (1 cycle of the fundamental harmonic) is uniformly divided into N pieces of sector zones. Then, representative values $r_i$ of radiuses per zone i corresponding to $\theta_i$ (i=0 to N−1) of the uniform pitch, are calculated using an averaging method or digital filter method or the like. When using an averaging method, radiuses $r_m$ at a plural (M) points existing in the sector zone i ($\theta_i$+(or −)$\Delta\theta/2$ (where $\Delta\theta/2 = 2\pi/N$)) are derived, as shown in FIG. 6. Then, a representative value $r_i$ is derived by the following equation.

$$r_i = \frac{1}{M} \sum_{m=1}^{M} r_m \quad \text{[Formula 15]}$$

Figure 7A:
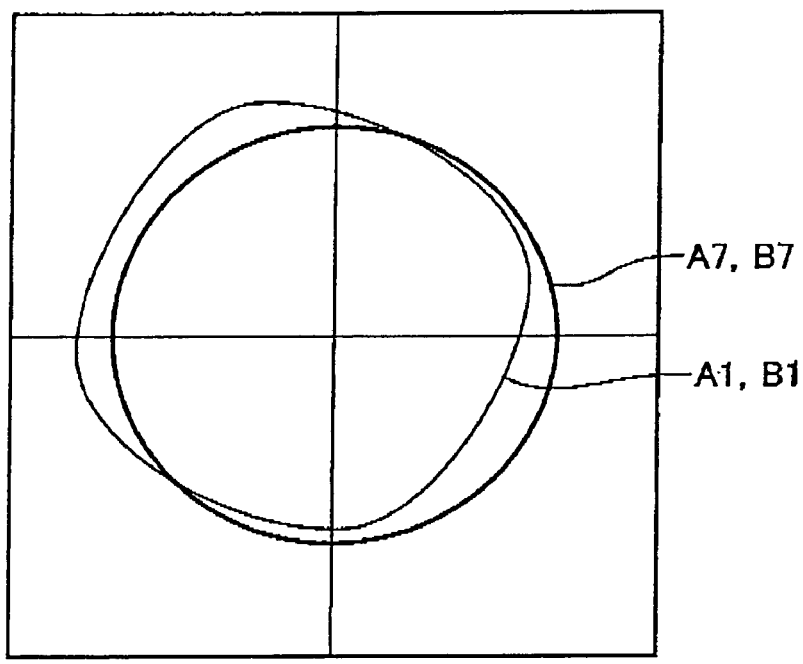
FIG. 7 is shows one example of a change in the Lissajous waveform before and after the execution of correction including the third harmonic distortion correction according to the device of this embodiment.
Figure 7B:
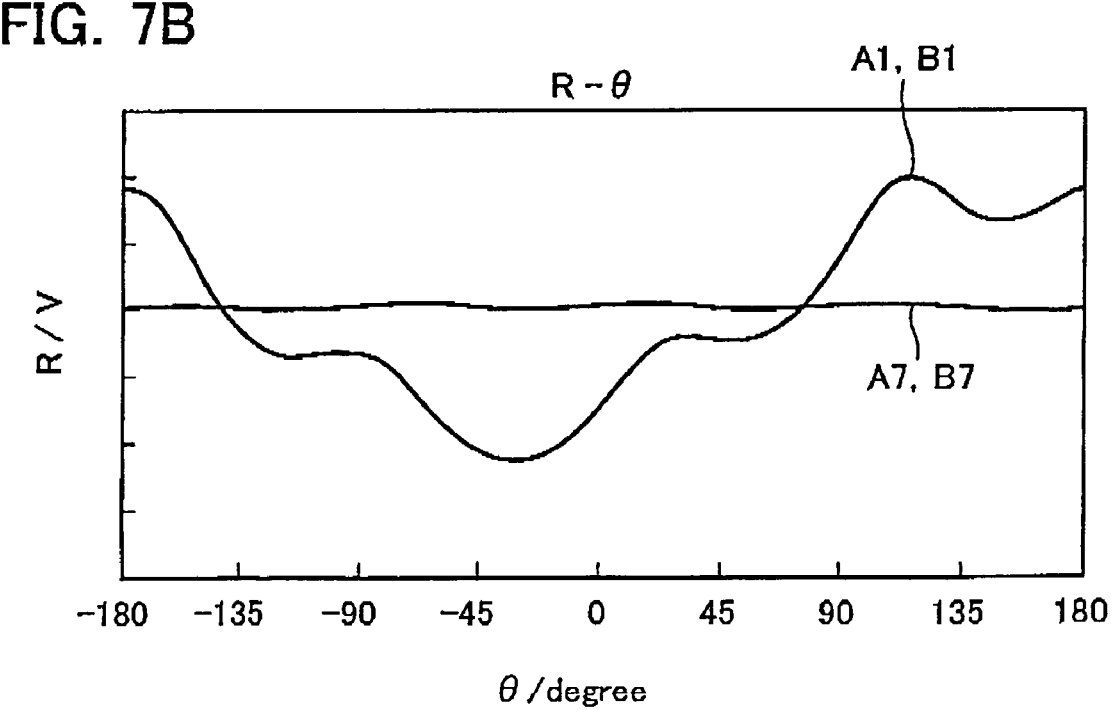

As described above, the third harmonic calculator/detector 41 calculates $a_1$, $a_3$, and $\phi_3$, which are used for correction in the third harmonic distortion corrector 40. The correction in the third harmonic distortion corrector 40, the r-θ conversion in the r-θ converter 50, and the computation of correction coefficients in the third harmonic computer/detector 41 are repeated several times to further remove the third harmonic components from the output signals A7, B7. As a result, the output signals A7, B7 can be approximated to ideal sinusoidal waveforms. FIG. 7A is for comparing a Lissajous waveform of signals A1, B1 before correction, and a Lissajous waveform of signals A7, B7. FIG. 7B is for comparing a change of the radius r during one cycle of the signal A1, B1 and one during one cycle of the signal A7, B7.

The embodiments of the invention have been described above though the present invention is not limited to these embodiments but rather can be devised to provide various modification and additions without departing from the scope and spirit of the invention. For example, in the above embodiments the A- and B-phase sinusoidal signals output from the encoder are subjected first to the offset, amplitude and phase corrections, then to the third harmonic correction though this order can be switched. Namely, the third harmonic correction may be executed first, and then the offset, amplitude and phase corrections may be executed thereafter. In the above embodiments the amplitude and phase corrections are executed in digital circuits though the same processes may be performed using a DSP or software.

Figure 8:
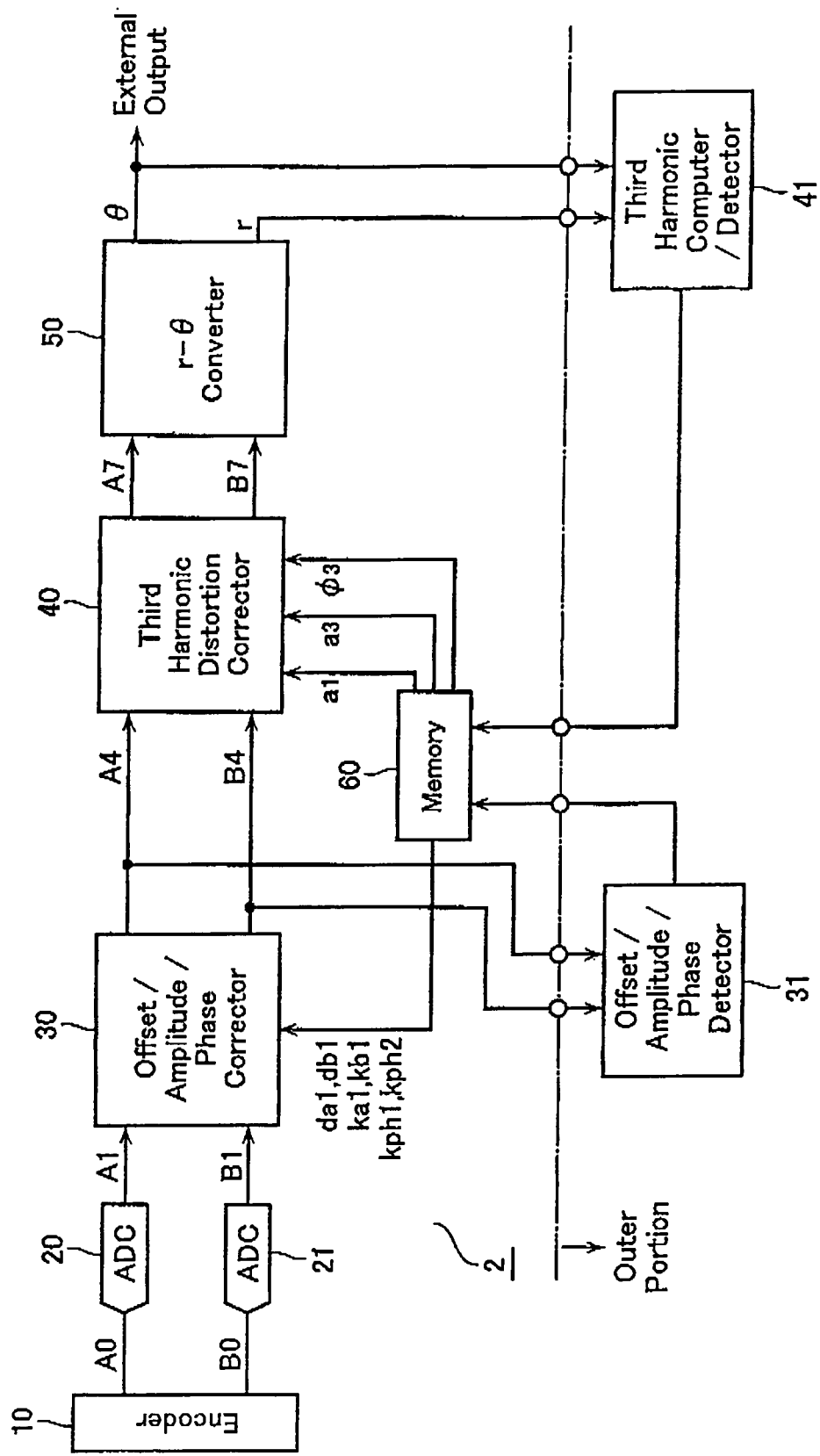
FIG. 8 is a block diagram showing a basic configuration of an encoder output signal correction device 2 according to another embodiment of the present invention.

Alternatively, as shown in FIG. 8, offset/amplitude/phase detector 31 and the third harmonic computer/detector 41 may be the external circuit of the encoder output signal correction device 2. Various detected parameters detected in these external circuits may be stored in a memory 60 at a proper manner.

In these configurations, at the timing of shipment from a factory or maintenance, the detector 31 and 41 are connected to the encoder output signal correction device 2. Then, detection by these detectors 31 and 41 is performed. Subsequently, the detectors 31 and 41 are disconnected from the encoder output signal correction device 2. In this way, correction can be executed by reading the detection parameters stored in the memory 60.

What is claimed is:

1. An encoder output signal correction apparatus for correcting two-phase sinusoidal signals with a phase difference output from an encoder, comprising:
    a third harmonic calculator calculating at least one of an amplitude and a phase of third harmonic component contained in said two-phase sinusoidal signals on the basis of a variation in radius of a Lissajous waveform of said two-phase sinusoidal signals, and
    a corrector correcting a third harmonic distortion in said two-phase sinusoidal signals on the basis of at least one of a amplitude and a phase calculated by said third harmonic calculator.

2. The encoder output signal correction apparatus according to claim 1, wherein said third harmonic calculator calculates a maximum and a minimum of a radius of said Lissajous waveform, and calculates an amplitude of said third harmonic component based on said maximum and said minimum.

3. The encoder output signal correction apparatus according to claim 1, wherein said third harmonic calculator detects a phase at the time the radius of said Lissajous waveform reaches said maximum and said minimum, and calculates a phase of said third harmonic component based on the detection result.

4. The encoder output signal correction apparatus according to claim 1, wherein said third harmonic calculator calculates a maximum and a minimum of a radius of said Lissajous waveform, and calculates an amplitude of said third harmonic component based on said maximum and said minimum, and further detects a phase at the time the radius of said Lissajous waveform reaches said maximum and said minimum, and calculates a phase of said third harmonic component based on the detection result.

5. The encoder output signal correction apparatus according to claim 1, wherein said third harmonic calculator derives a frequency signal component through a Fourier analysis of a variation in radius of said Lissajous waveform to calculate at least one of an amplitude and a phase of third harmonic component.

6. The encoder output signal correction apparatus according to claim 5, wherein said third harmonic calculator calculates a real part and an imaginary part of a Fourier transform using a recurrence equation.

7. The encoder output signal correction apparatus according to claim 5, wherein said third harmonic calculator divides one turn of said Lissajous waveform into uniform sector zones, and derives a a representative value of a radius of each of said sector zones.

8. The encoder output signal correction apparatus according to claim 1, wherein said corrector derives, based on the correlation between values of said two-phase sinusoidal signals and values of said third harmonic component when the phase of said third harmonic component is 0 or 90 degrees, values of said third harmonic components corresponding to each value of said two-phase sinusoidal signals, and said apparatus comprises a amplitude corrector subtract said value of said third harmonic component from said two-phase sinusoidal signals to correct an amplitude.

9. The encoder output signal correction apparatus according to claim 8, wherein said corrector comprises:
   a coordinate rotator rotating said Lissajous waveform of said two-phase sinusoidal signals including a third harmonic component by an phase calculated in said third harmonic calculator to make a state that the phase of said third harmonic component is 0 or 90 degrees; and
   a coordinate inverse rotator rotating inversely the Lissajous waveform of said two-phase sinusoidal signals output from said amplitude corrector by the same angle as one rotated in said coordinate rotator.

10. The encoder output signal correction apparatus according to claim 8, wherein said corrector further comprises a lookup table holding data indicating said correlation,
   wherein said amplitude corrector derives a value of said third harmonic component corresponding to each value of said two-phase sinusoidal signals referring to said lookup table.

11. The encoder output signal correction apparatus according to claim 10, wherein said corrector comprises:
   a coordinate rotator rotating said Lissajous waveform of said two-phase sinusoidal signals including a third harmonic component by an phase calculated in said third harmonic calculator to make a state that the phase of said third harmonic component is 0 or 90 degrees; and
   a coordinate inverse rotator rotating inversely the Lissajous waveform of said two-phase sinusoidal signals output from said amplitude corrector by the same angle as one rotated in said coordinate rotator.

12. An encoder output signal correction apparatus for correcting two-phase sinusoidal signals with a phase difference output from an encoder, comprising:
   a memory storing at least one of an amplitude and a phase of third harmonic component contained in said two-phase sinusoidal signals,
   a corrector correcting said third harmonic distortion in said two-phase sinusoidal signals, on the basis of at least one of said amplitude and said phase stored in said memory,
   said memory stores at least one of said amplitude and said phase written therein by an outer circuit calculating at least one of said amplitude and said phase, on the basis of a variation in radius of a Lissajous waveform of said two-phase sinusoidal signals.

* * * * *